(12) United States Patent
Yoo et al.

(10) Patent No.: US 11,734,965 B2
(45) Date of Patent: Aug. 22, 2023

(54) METHOD AND SYSTEM OF CALCULATING DISTANCE TO EMPTY OF EACH VEHICLE DRIVE MODE

(71) Applicants: Hyundai Motor Company, Seoul (KR); Kia Motors Corporation, Seoul (KR)

(72) Inventors: Seung Jae Yoo, Gyeonggi-do (KR); Hyun Woo Shin, Gyeonggi-do (KR); Chang Yu Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 106 days.

(21) Appl. No.: 16/696,220

(22) Filed: Nov. 26, 2019

(65) Prior Publication Data
US 2020/0342692 A1    Oct. 29, 2020

(30) Foreign Application Priority Data
Apr. 24, 2019    (KR) .................. 10-2019-0047662

(51) Int. Cl.
*G07C 5/02*    (2006.01)
*G01C 21/26*   (2006.01)
*G01F 9/00*    (2006.01)

(52) U.S. Cl.
CPC ............... *G07C 5/02* (2013.01); *G01C 21/26* (2013.01); *G01F 9/008* (2013.01)

(58) Field of Classification Search
CPC ............ G07C 5/02; G01C 21/26; G01F 9/008
See application file for complete search history.

(56) References Cited

U.S. PATENT DOCUMENTS

| | | | |
|---|---|---|---|
| 2009/0099724 A1* | 4/2009 | Kranz | G01F 15/063 701/33.4 |
| 2013/0073113 A1* | 3/2013 | Wang | B60W 20/11 701/1 |
| 2013/0158758 A1* | 6/2013 | Kim | G07C 5/004 701/123 |
| 2013/0173106 A1* | 7/2013 | Konishi | B60W 20/11 701/123 |
| 2013/0253740 A1* | 9/2013 | Kim | B60L 1/003 701/123 |
| 2013/0288206 A1* | 10/2013 | Takeuchi | G01C 21/3697 434/65 |

(Continued)

*Primary Examiner* — Dale W Hilgendorf
*Assistant Examiner* — Frank T Glenn, III
(74) *Attorney, Agent, or Firm* — Fox Rothschild LLP

(57) ABSTRACT

A system and method of calculating a vehicle DTE are provided to calculate a fuel efficiency of each vehicle drive mode, and display a more accurate DTE of each drive mode. The method includes when a driver selects a drive mode and a drive distance of the selected drive mode is accumulated while a vehicle is being driven in the selected mode, collecting drive data including an accumulated drive distance of each drive mode, and fuel efficiency information of each drive mode. A final fuel efficiency of each drive mode is calculated using a drive distance of each drive mode, a consumption energy of each drive mode or a fuel efficiency of each drive mode, and a learning fuel efficiency. A DTE of each drive mode is then calculated based on the calculated final fuel efficiency of each drive mode.

16 Claims, 3 Drawing Sheets

(56) References Cited

U.S. PATENT DOCUMENTS

| | | | | |
|---|---|---|---|---|
| 2015/0185063 | A1* | 7/2015 | Lee | G01F 9/023 |
| | | | | 701/123 |
| 2017/0343366 | A1* | 11/2017 | You | G01C 21/343 |
| 2018/0029500 | A1* | 2/2018 | Katanoda | G01C 21/3697 |
| 2018/0056900 | A1* | 3/2018 | Lee | G06N 5/04 |

* cited by examiner

METHOD AND SYSTEM OF CALCULATING DISTANCE TO EMPTY OF EACH VEHICLE DRIVE MODE

CROSS REFERENCE TO RELATED APPLICATION

The present application claims priority to Korean Patent Application No. 10-2019-0047662, filed Apr. 24, 2019, the entire contents of which is incorporated herein for all purposes by this reference.

BACKGROUND

Field of the Invention

The present invention relates to a method and system of calculating a distance to empty (DTE) of a vehicle, and more particularly, to a method of calculating a fuel efficiency and a DTE of each vehicle drive mode.

Description of the Related Art

Generally, a function of estimating a distance to empty (DTE) and providing the DTE to a driver is provided within a vehicle. For example, in a vehicle using an internal combustion engine, a DTE is estimated based on a fuel level within a fuel tank and the estimated DTE is provided to a driver through a cluster. Similarly, in an eco-friendly vehicle using a battery as driving power, a DTE is estimated based on a current battery available energy and is displayed through a cluster.

In addition, in recently released vehicles, to provide differentiated vehicle performance according to driving purpose, driving pattern and driver's demand, a plurality of drive modes are set, and a vehicle is operated based on a drive mode selected by the driver. For example, 3 to 4 drive modes may be provided and set in a vehicle, for example, an eco mode (ECO+/ECO), a comfort mode, a normal mode, a sport mode, etc. In addition, to enable the driver to select one of the plurality of drive modes, an input device such as a button is provided to allow the driver to manipulate the input device and select and switch the drive mode.

When the driver selects a drive mode, power performance and a driveline output, an air conditioning, a cluster display, etc. are operated based on set information of the selected drive mode, and thus driving feeling or stability of the vehicle may be differentiated based on the drive mode. Related to a function of displaying a DTE, conventionally, a fuel efficiency is not calculated separately for each drive mode even though an energy consumption varies according to each drive mode. In addition, a function of displaying a DTE according to each drive mode is not provided.

A fuel efficiency and a DTE are calculated and displayed using information of a past drive fuel efficiency and a fuel level (or battery available energy) regardless of a drive mode. In other words, even though all of a drive pattern, a fuel consumption, and a consumption energy vary according to a drive mode, conventionally, a fuel efficiency and a DTE are calculated and displayed without distinguishing the drive mode.

When a fuel efficiency and a DTE are calculated without distinguishing a drive mode even though a fuel consumption or consumption energy varies based on a drive mode, a final calculated DTE differs in value from an actual value. As a result, an inaccurate DTE is displayed on the vehicle, which may cause a fuel shortage condition while driving.

The foregoing is intended merely to aid in the understanding of the background of the present invention, and is not intended to mean that the present invention falls within the purview of the related art that is already known to those skilled in the art.

SUMMARY

Accordingly, the present invention provides a method and system of calculating a vehicle DTE, the method being capable of calculating a fuel efficiency of each vehicle drive mode, and calculating and displaying a more accurate DTE of each drive mode.

According to an exemplary embodiment of the present invention, a method of calculating a vehicle DTE may include: in response to receiving a driver selection of a drive mode and accumulating a drive distance of the selected drive mode while a vehicle is being driven in the selected mode, collecting, by a controller, drive data including an accumulated drive distance of each drive mode, and fuel efficiency information of each drive mode; calculating, by the controller, a final fuel efficiency of each drive mode using a drive distance of each drive mode, a consumption energy of each drive mode or a fuel efficiency of each drive mode, and a learning fuel efficiency obtained by performing learning while the vehicle is being driven; and calculating, by the controller, a DTE of each drive mode based on the calculated final fuel efficiency of each drive mode. As a result, according to a method of calculating a DTE of each vehicle drive mode according to the present invention, a fuel efficiency may be calculated for each vehicle drive mode, and a more accurate DTE may be calculated and displayed for each drive mode using the fuel efficiency.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
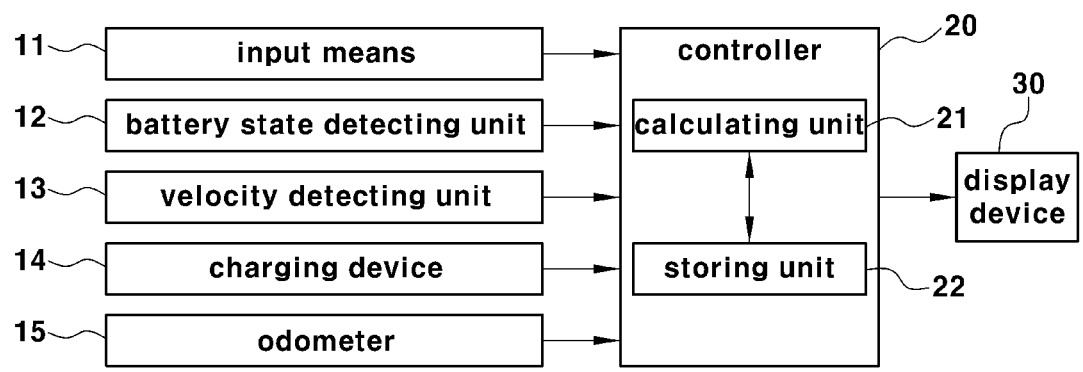
FIG. 1 is a view showing a configuration example of an apparatus for calculating a DTE according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor.

The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings so that those skilled in the art may easily carry out the present invention. However, the present invention is not limited to the exemplary embodiments described herein but may be embodied in other forms.

The present invention aims to calculate a fuel efficiency and a DTE of each drive mode of a vehicle, and the present invention may be applied to both a vehicle using an internal combustion engine that runs by driving an internal combustion engine (engine) with fuel, and an electric vehicle that runs by driving a motor with battery power. In addition, the present invention may be applied to a vehicle with a plurality of drive modes. Herein, the plurality of drive modes may be known drive modes. For example, the plurality of drive modes may include at least two known modes of an eco (ECO/ECO+) mode, a normal mode, a comfort mode, and a sports mode.

In the below description, a fuel efficiency is a concept that may be applied to a vehicle using an internal combustion engine and also to an electric vehicle, and is a concept including both a fuel consumption of a vehicle using an internal combustion engine and a fuel efficiency of an electric vehicle. Accordingly, in the below description, a fuel efficiency may refer to a general fuel efficiency of a vehicle using an internal combustion engine, or may also refer to including a fuel efficiency in an electric vehicle.

In addition, hereinafter, description will be made using an electric vehicle as an example, and in the below description, battery charging may refer to filling fuel in a vehicle using an internal combustion engine, a charging amount of a battery may refer to a fuel filling amount of a vehicle using an internal combustion engine, power charged in a battery may refer to a fuel filled in a fuel tank of a vehicle using an internal combustion engine, an energy consumption may refer to a fuel consumption of a vehicle using an internal combustion engine, and a battery available energy may refer to a remaining fuel amount (fuel level) in the fuel tank.

FIG. 1 is a view showing a configuration example of an apparatus for calculating a DTE according to the present invention. As shown in the figure, a DTE calculating apparatus may include: an input device 11; a battery state detecting unit 12; a velocity detecting unit 13; a charging device 14; an odometer 15; a controller 20; and a display device 30. Herein, the battery state detecting unit 12 and the charging device 14 may be replaced with a battery management system (BMS) (not shown). The controller 20 may be configured to operate the other components of the apparatus.

In other words, the BMS may be configured to receive a signal of the battery state detecting unit, obtain information of a battery available energy, and transmit the information to the controller 21 rather than the controller 20 directly receiving a signal of the battery state detecting unit 12, and obtaining information of a battery available energy. In addition, the BMS, rather than the charging device 14, may be configured to transmit information of a battery charging state and whether to charge the battery, etc. to the controller 20.

The input device 11 may include a button that allows a driver to select a drive mode, and to switch the drive mode by manipulating the same. An input interface may be applied for the input device 11 where the driver may input or manipulate the input device 11 within a vehicle. The battery state detecting unit 12 may be configured to detect battery state information that is used for calculating a battery remaining capacity (e.g., state of charge, SOC) or a battery available energy, and may be connected such that the detected battery state information is input to the controller 20. The battery state detecting unit 12 may be replaced with a fuel amount sensor (e.g., general fuel sensor) configured to detect a fuel level within a fuel tank for a vehicle using an internal combustion engine.

The velocity detecting unit 13 may be configured to detect a vehicle velocity, and input the velocity to the controller 20, and the charging device 14 may be configured to transmit information of a charging state and whether to charge the battery to the controller 20 when the vehicle battery is being charged. The charging device 14 may be replaced with a fuel filling device configured to provide information of a fuel filling state and whether to fill fuel for a vehicle using an internal combustion engine. In addition, the odometer 15 may be configured to calculate a vehicle drive distance and transmit the drive distance to the controller 20, and the display device 30 may be operated by the controller 20 to display a calculated DTE according to a control signal output from the controller 20. When another known detecting element capable of detecting a vehicle drive distance is present, the odometer 15 may be replaced with the detecting element.

The controller 20 may be configured to calculate a fuel efficiency of each drive mode (e.g., final fuel efficiency after blending and correction) and a DTE of each drive mode using a calculation method that will be described later, and may include a calculation unit 21 configured to calculate a fuel efficiency of each drive mode and a DTE of each drive mode using real-time input information and stored data, and a storing unit 22 configured to store data required for the calculation. In addition, the controller 20 may be configured to generate and output a control signal to display the DTE of each drive mode calculated by the calculating unit 21, and the display device 30 may be operated by the controller 20 to display the DTE of each drive mode according to the control signal output from the controller 20. The display device 30 may be a display unit provided in a cluster.

Further, input elements shown in FIG. 1 are merely examples, and the input elements are not limited as shown in the figure. Other input elements for detecting and inputting information required for obtaining a battery available energy, a drive distance, a drive fuel efficiency etc. may be applied. Meanwhile, conventionally, a drive fuel efficiency is calculated while the vehicle is being driven regardless of a drive mode. However, in the present invention, drive data may be collected for each drive mode, and a fuel efficiency of each drive mode and a DTE of each drive mode may be calculated from the drive data collected for each drive mode.

Figure 2:
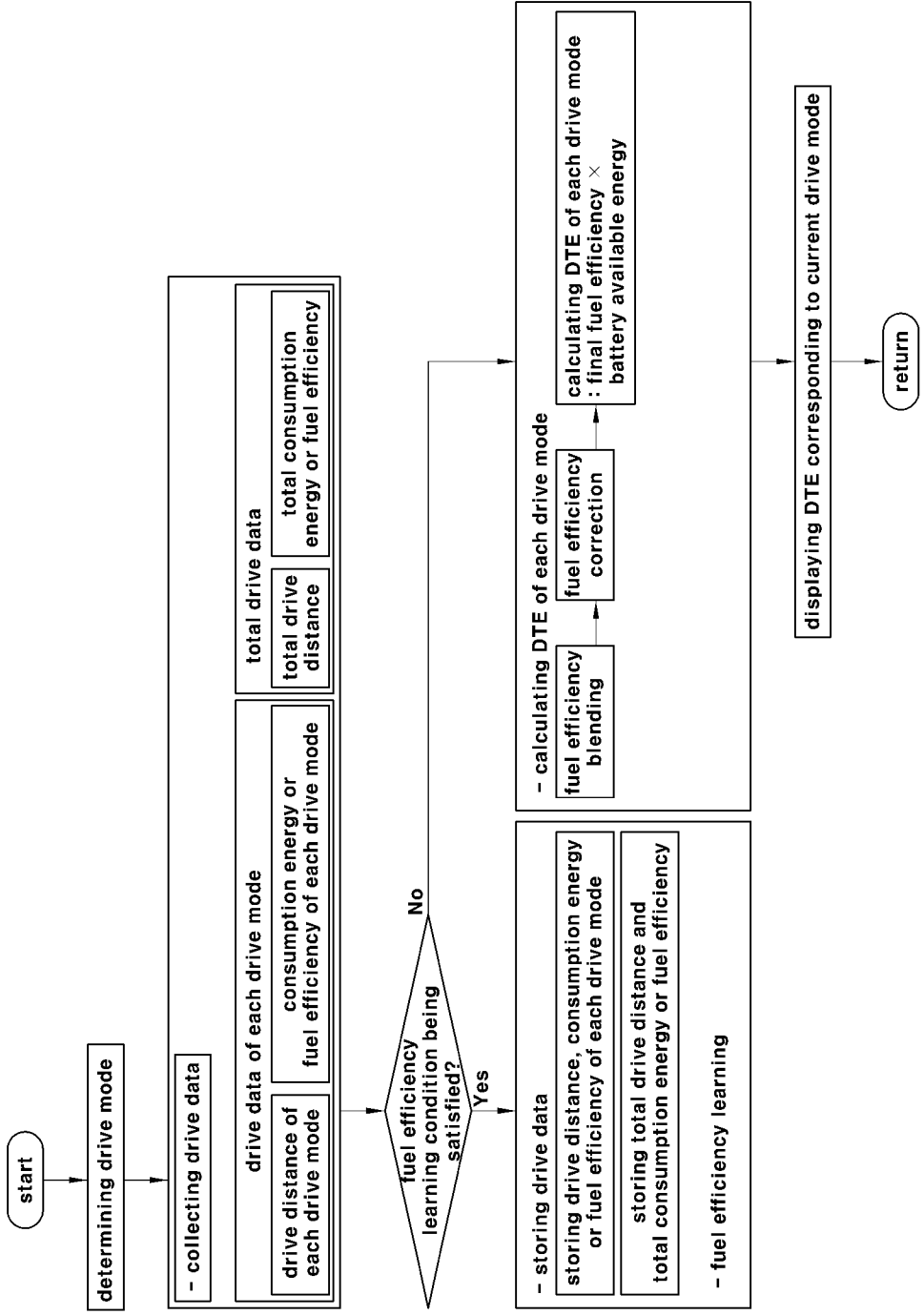
FIGS. 2 and 3 are views respectively showing a flowchart of a process of calculating a DTE according to an exemplary embodiment of the present invention.
Figure 3:
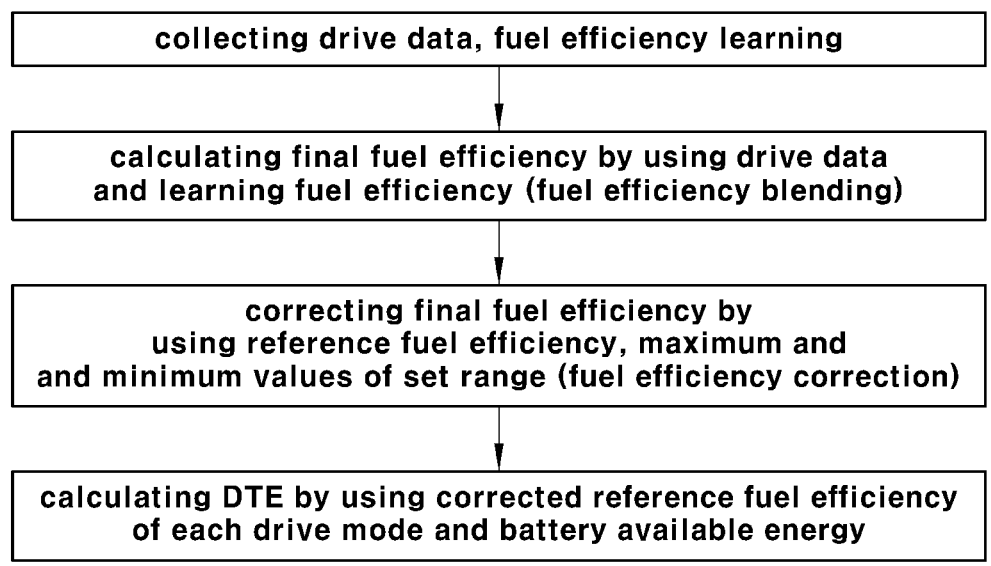

FIGS. 2 and 3 are views of a flowchart respectively showing a process of calculating a fuel efficiency of each drive mode and a DTE of each drive mode according to the present invention. The method described herein below may be executed by the controller. In particular, the controller 20 may be configured to determine a drive mode that is directly selected and set by a driver through the input device 11. FIG. 2 shows the entire process, and FIG. 3 shows a process of calculating a DTE of each drive mode.

In addition, the controller 20 may be configured to collect drive data while the vehicle travels. Herein, the drive data may include a drive distance (km) and a consumption energy (kWh) which are obtained while the vehicle is being driven, or may include a drive fuel efficiency (km/kWh) rather than a consumption energy (drive distance and drive fuel efficiency). Herein, the drive fuel efficiency (km/kWh) may be a value obtained by dividing the drive distance (km) by the consumption energy (kWh).

In particular, the drive data may be classified into drive data of each drive mode and total drive data regardless of the mode, and the controller 20 may be configured to collect a drive distance of a currently selected drive mode when the driver drives the vehicle in the selected drive mode, and a consumption energy or drive fuel efficiency (e.g., value obtained by dividing the drive distance by the consumption energy) as drive data of each drive mode.

Hereinafter, the drive fuel efficiency obtained as drive data of each drive mode is referral to as an actual drive fuel efficiency of each drive mode, and when the controller 20 obtains a consumption energy of each drive mode, an actual drive fuel efficiency of a corresponding drive mode may be calculated by dividing a drive distance of each drive mode by a consumption energy of the corresponding mode, and a final fuel efficiency of each drive mode may be calculated as discussed below by using the calculated actual drive fuel efficiency of each drive mode. In addition, the controller 20 may be configured to obtain, as the total drive data, the total drive distance and the total consumption energy which are accumulated after updating (e.g., update period: drive distance 1000 km) a previous fuel efficiency, or obtain a fuel efficiency calculated by dividing the total drive distance by the total consumption energy, and the total drive distance.

Subsequently, the controller 20 may be configured to store the obtained drive data in the storing unit 22 when the drive data satisfies a predetermined fuel efficiency learning condition. Herein, the fuel efficiency learning condition may include at least one of a condition where a predetermined or more energy is consumed, a condition of drive on or off, a condition where a vehicle has travelled a set distance or more, a condition where a vehicle has travelled a set time or more, and a condition of where a battery charging amount (e.g., fuel filling amount for a vehicle using an internal combustion engine) is equal to or greater than a set amount.

In addition, while performing fuel efficiency learning, whenever the total drive distance of the vehicle reaches a predetermined set distance (e.g., about 1000 km) after a previous fuel efficiency is updated (e.g., previous fuel efficiency learning), the controller 20 may be configured to calculate a fuel efficiency using the total drive distance and the total consumption energy which are accumulated after the previous fuel efficiency has been updated. In other words, the controller 20 may be configured to calculate a fuel efficiency by dividing the total drive distance by the total consumption energy. Herein, the calculated fuel efficiency may be accumulated to the previous learning fuel efficiency to calculate a new learning fuel efficiency by an average value of the accumulated values. The newly calculated learning fuel efficiency may be stored in the storing unit 22 of the controller 20, and the controller 20 may be configured to update the learning fuel efficiency to the newly calculated learning fuel efficiency.

However, under a condition where the learning condition is satisfied so that drive data is stored in the storing unit 22, or where the learning condition is not satisfied, the controller 22 may be configured to calculate a fuel efficiency of each drive mode (e.g., fuel efficiency for which blending and correction which will be described later are performed), and subsequently calculate a DTE of each drive mode using a battery available energy and a fuel efficiency of each drive mode.

In addition, the controller 20 may be configured to operate the display device 30 to display a DTE that corresponds to a drive mode currently selected by the driver when a DTE of each drive mode is calculated. A DTE (km) may be calculated as a value obtained by multiplying a battery available energy (kWh) to a fuel efficiency (km/kWh), or, for a vehicle using an internal combustion engine, may be calculated as a value obtained by multiplying a fuel level to a fuel efficiency.

Hereinafter, a process of calculating a DTE of each drive mode will be described in detail with reference to FIG. 3. First, when a driver selects a drive mode, and a vehicle is being driven in the selected drive mode, the controller 20 may be configured to collect drive data, that is, drive data of each drive mode, and the total drive data. When the fuel efficiency learning condition is satisfied, the collected drive data may be stored in the storing unit 22 of the controller 20.

Herein, the drive data of each drive mode may include a drive distance of each drive mode and a consumption energy of each drive mode, or include a drive distance of each drive mode and an actual drive fuel efficiency of each drive mode. Additionally, the actual drive fuel efficiency of each drive mode may be a value obtained by dividing a drive distance of each drive mode by a consumption energy of the corresponding drive mode. The total drive data may include the total drive distance and the total consumption energy which are integrally accumulated regardless of a drive mode, or a fuel efficiency (e.g., value obtained by dividing the total drive distance by the total consumption energy).

Further, when the fuel efficiency learning condition is satisfied, as described above, the controller 20 may be configured to update a learning fuel efficiency whenever the total drive distance of the vehicle reaches a set distance (e.g., about 1000 km) after a previous fuel efficiency is updated (e.g., previous fuel efficiency learning). Subsequently, the calculating unit 21 of the controller 20 may be configured to perform blending for an actual drive fuel efficiency of each drive mode and for a learning fuel efficiency while the vehicle is being driven to calculate a final fuel efficiency of each drive mode. When performing blending for the fuel efficiency, information of the total drive distance and the drive distance of each drive mode may be additionally used.

Herein, according to a ratio of the total drive distance to the drive distance of each drive mode, the final fuel efficiency of each drive mode may be calculated by performing blending for the actual drive fuel efficiency of each drive mode and for the learning fuel efficiency, and may be calculated using Formula 1 below.

$$CR_F = \frac{D_M}{D_T} \times CR_M + \left(1 - \frac{D_M}{D_T}\right) \times CR_L \quad \text{Formula 1}$$

wherein, $CR_F$ represents a final fuel efficiency of each drive mode, $D_M$ represents a drive distance of each drive mode, $D_T$ represents the total drive distance, $CR_M$ represents an actual drive fuel efficiency of each drive mode, and $CR_L$ represents a learning fuel efficiency.

Meanwhile, A finally calculated DTE of each drive mode may be calculated to satisfy the following relation "eco>normal>sport" when the final fuel efficiency of each drive mode is calculated as described above. A reverse phenomenon may be prevented where a size of the DTE of each drive mode is determined in an order differing from the above relation. Accordingly, to prevent such a reverse phenomenon and to prevent a state where deviations in DTEs between drive modes become excessive, the final fuel efficiency of each drive mode calculated using the Formula 1 may be corrected such that a deviation with a reference fuel efficiency is within a preset range.

In reference, the actual drive fuel efficiency of each drive mode, the final fuel efficiency of each drive mode, and the DTE of each drive mode which are described above refer to that an actual drive fuel efficiency and a final fuel efficiency, and a DTE are separately calculated for each drive mode. In other words, when an eco mode, a normal mode, and a sport mode are present as a drive mode, it means that an active fuel efficiency and a final fuel efficiency, and a DTE of the eco mode may be calculated, an actual drive fuel efficiency and a final fuel efficiency, and a DTE, of the normal mode may be calculated, and an active fuel efficiency and a final fuel efficiency, and a DTE, of the sport mode may be calculated.

In the above correction process, the reference fuel efficiency may be determined as a final fuel efficiency of a drive mode which represents a maximum drive distance among drive distances of drive modes. When the final fuel efficiency of each drive mode is calculated by the above Formula 1 and the reference fuel efficiency is determined, the controller 20 may be configured to calculate a deviation between the final fuel efficiency of each drive mode and the reference fuel efficiency. When the deviation is within the preset range, the controller 20 may be configured to determine the final fuel efficiency of the arbitrary mode which is calculated by Formula 1 as a final value of the corresponding mode without performing correction.

However, when the deviation is greater than a maximum value of the preset range, a final fuel efficiency of a mode that corresponds to the mode where the deviation is calculated with the reference fuel efficiency may be corrected so that the deviation becomes maximum, and the corrected fuel efficiency may be determined as a final value. However, when the deviation is less than a minimum value of the preset range, a final fuel efficiency of a mode that corresponds to a mode from where the deviation is calculated with the reference fuel efficiency may be corrected so that the deviation becomes minimum, and the corrected fuel efficiency may be determined as a final value.

As described above, the controller 20 may be configured to correct a final fuel efficiency of each drive mode based on a reference fuel efficiency so that deviations in final fuel efficiency between drive modes become a value within a preset range. When a final fuel efficiency for each drive mode is calculated as above by performing fuel efficiency blending and fuel efficiency correction, the controller 20 may be configured to calculate a DTE of each drive mode by multiplying the final fuel efficiency of each mode to a battery available energy (or, a level), and operate the display device 30 to display a DTE of a drive mode that is currently selected by the driver.

Hereinafter, a process of calculating a DTE of each drive mode will be described in detail by way of numerical examples. In the following description, the numerical values are illustrative and the present invention is not limited thereto, and can be variously changed.

Table 1 below shows an example of drive data of each drive mode assuming that three drive modes which are an eco mode, a normal mode, and a sport mode, are set in the vehicle and the vehicle has travelled the total drive distance of about 1000 km.

TABLE 1

|  | Drive distance [km] | Consumption energy [kWh] | Actual fuel efficiency of each drive mode [km/kWh] |
|---|---|---|---|
| Eco mode | 692 | 86.5 | 8 |
| Normal mode | 154 | 21.2 | 7.3 |
| Sport mode | 154 | 30.7 | 5 |

Table 2 below shows total drive data assuming that the total drive distance is about 1000 km, the total consumption energy is about 138.4 kWh, and a learning fuel efficiency is about 7.2. In addition, Table 2 shows an example of calculating a final fuel efficiency of each drive mode using Formula 1.

TABLE 2

|  | Drive distance [km] | Consumption energy [kWh] | Final fuel efficiency of each drive mode [km/kWh] |
|---|---|---|---|
| Total drive data | 1000 | 138.4 | Learning fuel efficiency: 7.2 |
| Eco mode | 692 | 86.5 | 7.8 km/kWh $\left(\frac{692}{1000} \times 8 + \left(1 - \frac{692}{1000}\right) \times 7.2\right)$ |

TABLE 2-continued

|  | Drive distance [km] | Consumption energy [kWh] | Final fuel efficiency of each drive mode [km/kWh] |
|---|---|---|---|
| Normal mode | 154 | 21.2 | 7.2 km/kWh $\left(\frac{154}{1000} \times 7.3 + \left(1 - \frac{154}{1000}\right) \times 7.2\right)$ |
| Sport mode | 154 | 30.7 | 6.9 km/kWh $\left(\frac{154}{1000} \times 5.0 + \left(1 - \frac{154}{1000}\right) \times 7.2\right)$ |

Referring to Table 2, Table 2 shows a drive distance of each drive mode, and shows that a drive distance of an eco-mode is about 692 km, a drive distance of a normal mode is about 154 km, and a drive distance of a sport mode is about 154 km.

In addition, as a consumption energy of each drive mode, Table 2 shows that a consumption energy during an eco-mode is about 86.5 kWh, a consumption energy during a normal mode is about 21.2 kWh, and a consumption energy during a sport mode is about 30.7 kWh. In addition, referring to Table 2, by using Formula 1, a final fuel efficiency of each drive mode may be calculated by using the total drive distance and a drive distance of each drive mode, an actual drive fuel efficiency of each drive mode, and a learning fuel efficiency, and as a final fuel efficiency of each drive mode, a final fuel efficiency of an eco-mode is calculated as about 7.8 km/kWh, a final fuel efficiency of a normal mode is calculated as about 7.2 km/kWh, and a final fuel efficiency of a sport mode is calculated as about 6.9 km/kWh.

As a fuel efficiency before correction, to limit deviations in final fuel efficiency between drive modes to be within a preset range, the controller 20 may be configured to perform correction for the above final fuel efficiency of each drive mode, and, for example, assuming that about 0.4 to 0.8 km/kWh is preset for the preset range, a maximum value of the deviation is about 0.8 km/kWh, and a minimum value of the deviation is about 0.4 km/kWh. In addition, to perform fuel efficiency correction for preventing an excessive deviation, a reference fuel efficiency has to be determined, a final fuel efficiency (e.g., about 7.8 km/kWh) of an eco-mode that shows a maximum drive distance (e.g., about 692 km) among drive distances of drive modes may be determined as the reference fuel efficiency.

Accordingly, a deviation between a final fuel efficiency (e.g., about 7.2 km/kWh) of a normal mode and the reference fuel efficiency (e.g., about 7.8 km/kWh) becomes about 0.6 km/kWh, and the above deviation is a value within the preset range, thus the final fuel efficiency of the normal mode may be determined as a final value without correction. However, a deviation between the final fuel efficiency (e.g., about 6.9 km/kWh) of the sport mode and the reference fuel efficiency (e.g., about 7.8 km/kWh) becomes about 0.9 km/kWh, and the above deviation is a value exceeding the preset range.

In other words, the deviation between the reference fuel efficiency and the final fuel efficiency of the sport mode is about 0.9 km/kWh, and the above deviation is greater than the maximum value of about 0.8 km/kWh, while the deviation is limited to about 0.8 km/kWh. As a result, the final fuel efficiency of the sport mode may be corrected to about 7.0 km/kWh by subtracting the limited deviation (e.g., the maximum deviation value of the preset range) of about 0.8 km/kWh from the reference fuel efficiency (e.g., about 7.8 km/kWh), and the corrected final fuel efficiency of the sport mode which is about 7.0 km/kWh may be determined as a final value.

When the final fuel efficiency of each drive mode is determined as above, the controller 20 may be configured to determine a DTE of each drive mode from the final fuel efficiency of each drive mode using a current battery available energy (kWh). Herein, a DTE (km) of each drive mode may be calculated by multiplying the corrected fuel efficiency (km/kWh) of each drive mode to the battery available energy (kWh), and Table 3 below shows an example of a DTE of each drive mode which is calculated by assuming that the current battery available energy is about 30 kWh.

TABLE 3

| Drive mode | Eco mode | Normal mode | Sport mode |
|---|---|---|---|
| DTE of each drive mode | 234 km | 216 km | 204 km |

When a DTE of each drive mode is calculated as above, the controller 20 may be configured to display a DTE of a drive mode that is currently selected through the display device 30. As described above, by using a method of calculating a DTE of each vehicle drive mode according to the present invention, a fuel efficiency may be calculated for each vehicle drive mode, thus a more accurate DTE may be calculated and displayed for each drive mode.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of calculating a distance to empty (DTE) of vehicle drive modes of a vehicle, comprising:
   in response to receiving a driver selection as a drive mode and accumulating a drive distance of the selected drive mode while a vehicle is being driven in the selected mode, collecting, by a controller, drive data including an accumulated drive distance of each drive mode of an eco mode, a comfort mode, a normal mode, and a sport mode, and fuel efficiency information of each drive mode of the eco mode, the comfort mode, the normal mode, and the sport mode;
   calculating, by the controller, a final fuel efficiency of each drive mode of the eco mode, the comfort mode, the normal mode, and the sport mode using a drive distance of each drive mode of the eco mode, the comfort mode, the normal mode, and the sport mode, a consumption energy of each drive mode or a fuel efficiency of each drive mode, and a learning fuel efficiency of each drive mode obtained by performing learning while the vehicle is being driven;

calculating, by the controller, a DTE of each drive mode based on the calculated final fuel efficiency of each drive mode, and displaying, in response to a control signal output from the controller, on a display device a DTE of a mode that corresponds to the driver selection of the drive mode among the calculated DTEs of the respective drive modes, wherein the final fuel efficiency of the selected drive mode is calculated by performing blending for the actual drive fuel efficiency of the each drive mode of the eco mode, the comfort mode, the normal mode, and the sport mode and for the learning fuel efficiency of each drive mode of the eco mode, the comfort mode, the normal mode, and the sport mode according to a ratio of the total drive distance of the eco mode, the comfort mode, the normal mode, and the sport mode to the drive distance of the each drive mode of the eco mode, the comfort mode, the normal mode, and the sport mode.

2. The method of claim 1, wherein in the collecting of the drive data, the drive data further includes total drive distance inform accumulated while the vehicle travels, and the calculating of the final fuel efficiency of each drive mode further includes calculating, by the controller, the final fuel efficiency of each drive mode by further using the total drive distance information.

3. The method of claim 2, wherein in the calculating of the final fuel efficiency of each drive mode, the final fuel efficiency of each drive mode is a final fuel efficiency of each drive mode calculated using the formula below, $$CR_F = \frac{D_M}{D_T} \times CR_M + \left(1 - \frac{D_M}{D_T}\right) \times CR_L \qquad \text{Formula}$$

wherein, $CR_F$ is a final fuel efficiency of each drive mode, $D_M$ is a drive distance of each drive mode, $D_T$ is the total drive distance, $CR_M$ is a fuel efficiency of each drive mode which becomes the drive data, and $CR_L$ is a learning fuel efficiency.

4. The method of claim 2, wherein in the collecting of the drive data, the drive data further includes a total consumption energy or fuel efficiency while the vehicles is being driven, and the obtained drive data is stored when the drive data satisfies a predetermined fuel efficiency learning condition.

5. The method of claim 2, wherein when the total drive distance travelled by the vehicle reaches a predetermined set distance after updating a previous fuel efficiency, the method further includes:

calculating, by the controller, a fuel efficiency from the total drive distance and the total consumption energy which are accumulated after the previous fuel efficiency has been updated;

calculating, by the controller, a new learning fuel efficiency by adding the calculated fuel efficiency, which is calculated from the total drive distance and the total consumption energy, to the previous learning fuel efficiency, and by obtaining an average of the same; and updating, by the controller, the learning fuel efficiency to the newly calculated learning fuel efficiency, and storing the newly calculated learning fuel efficiency.

6. The method of claim 1, wherein the collecting of the drive data includes: collecting, by the controller, consumption energy or fuel consumption information which is accumulated for each drive mode while the vehicle is being driven, wherein the fuel efficiency of each drive mode used when calculating the final fuel efficiency is a value obtained by dividing the drive distance of each drive mode, which is collected as the drive data, by the consumption energy or fuel consumption of the corresponding mode.

7. The method of claim 1, wherein the calculating of the DTE of each drive mode includes:

correcting, by the controller, the calculated final fuel efficiency of each drive mode to adjust a deviation in final fuel efficiency between the drive modes to become within a predetermined set range; and calculating, by the controller, the DTE of each drive mode of the vehicle using the corrected final fuel efficiency of each drive mode.

8. The method of claim 7, wherein the deviation in final fuel efficiency between the drive modes is calculated as a deviation between a reference fuel efficiency and the final fuel efficiency of each drive mode when the controller determined the reference fuel efficiency among the final fuel efficiencies of the respective drive modes, wherein the controller determines the reference fuel efficiency among the final fuel efficiencies of the respective drive modes.

9. The method of claim 8, further comprising:

determining, by the controller, the final fuel efficiency of the drive mode which represents a maximum drive distance among the drive distances of the respective drive modes as the reference fuel efficiency.

10. The method of claim 8, wherein when the deviation in final fuel efficiency between the drive modes is greater than a maximum value of the predetermined set range, the fuel efficiency of the drive mode from which the deviation is calculated with the reference fuel efficiency is corrected to adjust the deviation to become the maximum value.

11. The method of claim 8, wherein when the deviation in final fuel efficiency between the drive modes is less than a minimum value of the predetermined set range, the final fuel efficiency of the drive mode from which the deviation is calculated with the reference fuel efficiency is corrected to adjust the deviation to become the minimum value.

12. A system for calculating a distance to empty (DTE) of vehicle drive modes of a vehicle, comprising:

a memory configured to store program instructions; and a processor configured to execute the program instructions, the program instructions when executed configured to:

in response to receiving a driver selection as a drive mode and accumulating a drive distance of the selected drive mode while a vehicle is being driven in the selected mode, collect drive data including an accumulated drive distance of each drive mode, and fuel efficiency information of each drive mode of an eco mode, a comfort mode, a normal mode, and a sport mode;

calculate a final fuel efficiency of each drive mode using a drive distance of each drive mode of the eco mode, the comfort mode, the normal mode, and the sport mode, a consumption energy of each drive mode of the eco mode, the comfort mode, the normal mode, and the sport mode or a fuel efficiency of each drive mode of the eco mode, the comfort mode, the normal mode, and the sport mode, and a learning fuel efficiency obtained by performing learning while the vehicle is being driven; and calculate a DTE of each drive mode based on the calculated final fuel efficiency of each drive mode of the eco mode, the comfort mode, the normal mode, and the sport mode.

13. The system of claim 12, wherein the controller is configured to operate a display device to display a DTE of a mode that corresponds to the driver selection of the drive mode among the calculated DTEs of the respective drive modes.

14. The system of claim 12, wherein in the collecting of the drive data, the drive data further includes total drive distance information accumulated while the vehicle travels, and in the calculating of tile final fuel efficiency of each drive mode the controller is configured to calculate the final fuel efficiency of each drive mode by further using the total drive distance information.

15. The system of claim 14, wherein in the calculating of the final fuel efficiency of each drive mode, the final fuel efficiency of each drive mode is a final fuel efficiency of each drive mode calculated using the formula below, $$CR_F = \frac{D_M}{D_T} \times CR_M + \left(1 - \frac{D_M}{D_T}\right) \times CR_L \qquad \text{Formula}$$

wherein, $CR_F$ is a final fuel efficiency of each drive mode, $D_M$ is a drive distance of each drive mode, $D_T$ is the total drive distance, $CR_M$ is a fuel efficiency of each drive mode which becomes the drive data, and $CR_L$ is a learning fuel efficiency.

16. A method of calculating a distance to empty (DTE) of vehicle drive modes of a vehicle, comprising:
in response to receiving a driver selection as a drive mode and accumulating a drive distance of the selected drive mode while a vehicle is being driven in the selected mode, collecting, by a controller, drive data including an accumulated drive distance of each drive mode of an eco mode, a comfort mode, a normal mode, and a sport mode, and fuel efficiency information of each drive mode of the eco mode, the comfort mode, the normal mode, and the sport mode;

calculating, by the controller, a final fuel efficiency of each drive mode using a drive distance of each drive mode of the eco mode, the comfort mode, the normal mode, and the sport mode, a consumption energy of each drive mode of the eco mode, the comfort mode, the normal mode, and the sport mode or a fuel efficiency of each drive mode of the eco mode, the comfort mode, the normal mode, and the sport mode, and a learning fuel efficiency obtained by performing learning while the vehicle is being driven;

calculating, by the controller, a DTE of each drive mode of the eco mode, the comfort mode, the normal mode, and the sport mode based on the calculated final fuel efficiency of each drive mode of the eco mode, the comfort mode, the normal mode, and the sport mode, and displaying, in response to a control signal output from the controller, on a display device a DTE of a mode that corresponds to the driver selection of the drive mode among the calculated DTEs of the respective drive modes, wherein the final fuel efficiency of each drive mode is calculated by performing blending for the actual drive fuel efficiency of the each drive mode and for the learning fuel efficiency of each drive mode according to a ratio of the total drive distance of each drive mode to the drive distance of each drive mode, using the formula below, $$CR_F = \frac{D_M}{D_T} \times CR_M + \left(1 - \frac{D_M}{D_T}\right) \times CR_L \qquad \text{Formula}$$

wherein, $CR_F$ is a final fuel efficiency of each drive mode, $D_M$ is a drive distance of each drive mode, $D_T$ is the total drive distance, $CR_M$ is a fuel efficiency of each drive mode which becomes the drive data, and $CR_L$ is a learning fuel efficiency.

* * * * *